United States Patent

[11] 3,549,901

[72] Inventors John D. Ross
Dollard des Ormeaux;
Ole Skrydstrup, Montreal, Quebec, Canada
[21] Appl. No. 649,548
[22] Filed June 28, 1967
[45] Patented Dec. 22, 1970
[73] Assignee Central Dynamics, Ltd.
Pointe Claire, Montreal, Quebec, Canada, a body corporate and Politic
[32] Priority Mar. 30, 1967
[33] Canada
[31] No. 986,626

[54] EQUALIZER CIRCUITRY INCORPORATING APERTURE CORRECTOR AND INDEPENDENT GAIN ADJUSTMENT

7 Claims, 3 Drawing Figs.

[52] U.S. Cl. .......... 307/235; 178/5.4, 307/233, 307/293, 307/304
[51] Int. Cl. .......... H03n 5/44
[50] Field of Search .......... 307/235, 233; 333/14; 330/69, 84; 178/12G, 5.4, (Digest)

[56] References Cited

UNITED STATES PATENTS

| | | | |
|---|---|---|---|
| 2,883,450 | 4/1959 | Altes .......... | 178/5.4 |
| 2,892,884 | 6/1959 | Gibson .......... | 178/5.4 |
| 2,957,042 | 10/1960 | Gibson et al. .......... | 333/28 |
| 3,289,095 | 11/1966 | Johnson .......... | 330/30D |
| 3,436,490 | 4/1969 | Roelofs .......... | 330/69 |

OTHER REFERENCES

"Field Effect Transistor As A Linear Variable Resistor" by W. Y. Elliott, Jr., IBM Technical Disclosure Bulletin, vol. 7, No. 1 June 1964.

*Primary Examiner*—Donald D. Forrer
*Assistant Examiner*—Harold A. Dixon
*Attorney*—Gerald J. Ferguson, Jr.

ABSTRACT: An equalizer using an aperture corrector is disclosed where typically the equalizer operates upon a composite color video signal, the color signal including luminance and chrominance signal components. The chrominance component is extracted from the composite color signal so that its amplitude may be adjusted with respect to the luminance component if this is necessary. The extraction of the chrominance signal is accomplished by an aperture corrector. After adjustment, if necessary, of the amplitude of the extracted signal in a bridge circuit, the extracted signal is recombined with the composite signal to thereby provide the desired equalization of the composite signal. The bridge circuit includes a variable resistor such as a field effect transistor to which is applied a control signal for varying the resistance thereof and thus amplitude adjustment of the extracted signal is accomplished. Also included in the bridge circuit is a resistor made of silicon, the same material as that of the field effect transistor thereby providing temperature compensation of the output signal from the bridge circuit.

INVENTORS
JOHN D. ROSS
OLE SKRYDSTRUP

BY Gerald J. Ferguson Jr.
ATTORNEY

EQUALIZER CIRCUITRY INCORPORATING APERTURE CORRECTOR AND INDEPENDENT GAIN ADJUSTMENT

BACKGROUND OF THE INVENTION

This invention relates to equalizers, and, in particular, to equalizers which operate on composite signals having a first signal component the amplitude of which must be adjusted with respect to the amplitude of a second signal component of the composite signal, the first and second components being at different frequencies.

The invention also relates to an improved aperture corrector and, in particular, to aperture correctors for use in color television applications.

At the transmitting end of a television broadcasting system, it is desirable to process the composite video signal several times prior to modulation of the radio frequency carrier signal. Each time the signal is processed, any deterioration of the signal is effectively removed thereby restoring it to its original fidelity. Although the signal may deteriorate in many ways, one particularly serious type of deterioration occurs in color television applications when the ratio of the amplitudes of the luminance component to the chrominance component of the composite color video signal significantly varies from a predetermined ratio. Usually the problem arises because of a decrease in the amplitude of the chrominance signal component with respect to the luminance signal component amplitude. However, in some instances the contrary may be true.

Thus, it is a primary purpose of this invention to provide improved equalization of a composite color video signal wherein the amplitude of the chrominance component can be adjusted with respect to the amplitude of the luminance component of the signal.

As will be described in more detail hereinafter, the chrominance component is extracted from the composite signal by an aperture corrector. Aperture correctors, heretofore, have been employed to improve the horizontal resolution of television camera tubes, as is explained in the text Television Engineering Handbook by Donald G. Fink, McGraw-Hill Co., Inc., 1957, Pages 17—97 and 17—98. Aperture correctors are shown in the above text on Pages 16—118 and 17—101. These aperture correctors have shortcomings such as: (1) the inability to remotely control the high frequency output and (2) the tendency of the low frequency gain to vary with changes in the high frequency gain. Remote control of the high frequency gain is not practicable with the prior art aperture correctors shown in the above text since effective wide band nonmechanical potentiometers, such as employed in the prior art aperture correctors, are not available.

Thus, it is a further primary object of this invention to provide an improved equalizer employing an aperture corrector to modify the high frequency response of a video channel.

It is a further object of this invention to employ such an equalizer where the aperture corrector acts as a high frequency filter having zero response at DC.

It is a further object of this invention to provide an improved aperture corrector, the high frequency gain of which is capable of being remotely controlled.

It is a further object of this invention to provide an improved aperture corrector, the low frequency gain of which remains constant for changes in the high frequency gain.

Further objects and advantages of the invention will become apparent from a reading of the following detailed description of the invention together with the claims.

SUMMARY

Thus, the objects and advantages of this invention are accomplished by an equalizer which modifies the high frequency response of a first video channel by providing a second channel or side loop which incorporates an aperture corrector, which in turn, includes (1) means for extracting a high frequency signal such as the chrominance signal component of a color television signal and (2) bridge circuit means including a variable resistor such as a field effect transistor for adjusting the amplitude and polarity of the extracted chrominance signal. Means are also provided for adding the adjusted, extracted signal with the signal in the first channel thereby accomplishing the desired equalization.

Description of the Preferred Embodiment

Figures 1, 2:
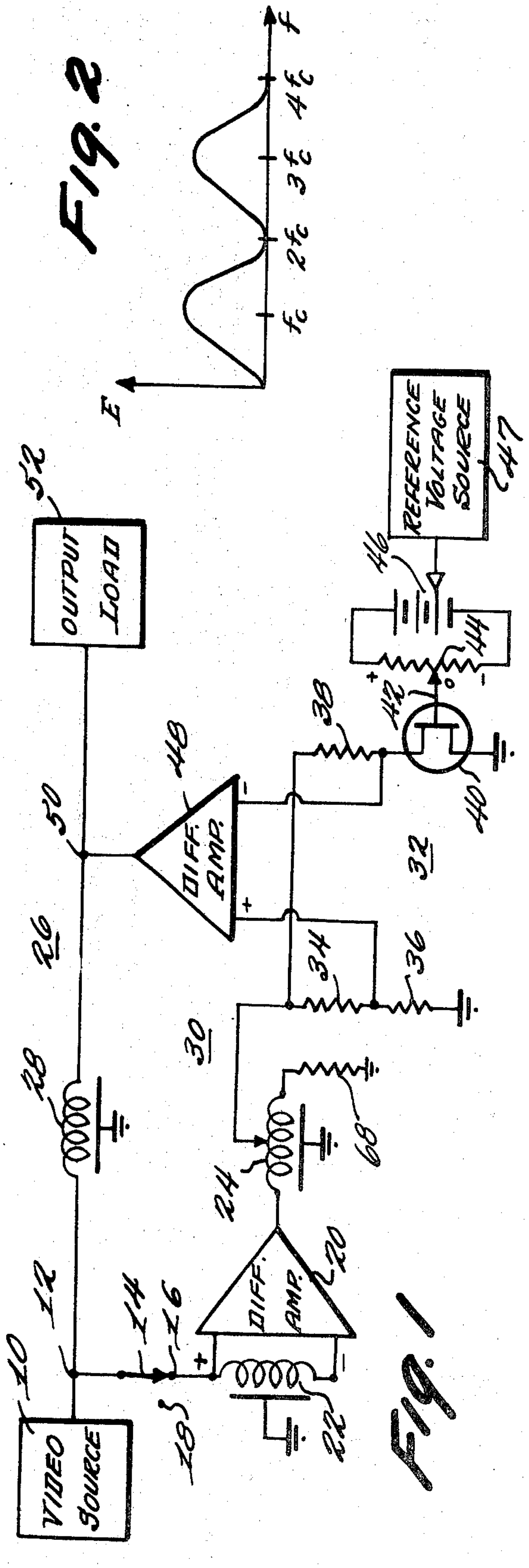
FIG. 1 is a combined block and schematic diagram of an illustrative embodiment of the equalizer according to the invention.
FIG. 2 is a graph illustrating the frequency response of the aperture corrector of this invention.

Referring to the FIG. 1, there is shown a source 10 of a composite video signal which contains a chrominance or first signal component and a luminance or second signal component, the chrominance signal being of a higher frequency than the luminance signal. In order to equalize the composite video signal, the amplitude of the chrominance signal component with respect to the luminance signal component must be adjusted. When the switch 14 is moved to terminal 16, equalization is obtained and vice versa when it is moved to terminal 18. Switch 14 is preferably of the electronic type and remotely controllable.

Connected to switch 14 is differential amplifier 20, the inputs of which are connected together by delay line 22. Delay line 22 causes a delay approximately equal to one-half of the period of the chrominance signal frequency which is to be extracted from the video signal. As will be described in more detail hereinafter, this causes the amplifier 22 together with delay line 24 to have a frequency response as shown in FIG. 2 with the chrominance frequency component $f_c$ occurring somewhere near the hump of the response and thereby being boosted in amplitude while the luminance frequency is substantially reduced in amplitude.

Adjustable delay line 24 is connected to the output of amplifier 20 thereby providing a fine time delay adjustment of the extracted chrominance signal with respect to the composite signal in the main or first channel 26. Delay line 28 provides approximate time delay compensation for the signal components of second channel or loop 30 where the chrominance signal is extracted.

The extracted chrominance signal is applied from delay line 24 to bridge circuit 32 which comprises resistors 34, 36 and 38 and a variable resistor such as field effect transistor (FET) 40. Resistor 38 is made from silicon to provide temperature compensation for FET 40 which is also made of silicon. Of course, if FET 40 is made of another material, resistor 38 would also be made of this other material.

The resistance of FET 40 can be increased or decreased by adjustment of the wiper 42 of potentiometer 44 thereby varying the amplitude of the control signal applied to the FET. Battery 46 is connected to reference voltage source 47 as shown in FIG. 1. Thus, when wiper 42 is at its center position, the bridge output is nulled at differential amplifier 48. If the wiper is positioned away from the center position, the amplitude of the chrominance information in the composite video signal at terminal 50 is increased or decreased depending on whether wiper 42 is positioned toward the positive or negative terminal of battery 46.

Potentiometer 44 is usually located at a position remote from FET 40 thereby permitting remote control operation of the equalizer side loop 30. Thus, a supervisory engineer can determine the need for equalization at a plurality of signal-processing units (each of which would include an equalizer in accordance with this invention) and provide the required equalization by merely adjusting the potentiometers 44 which would be respectively associated with plurality of equalizers. Such ease of control over the system would not be available if the before-mentioned aperture correctors of the prior art were employed since they do not readily lend themselves to remote control, as explained hereinbefore.

The differential amplifier 20 together with delay line 22, the bridge circuit 32, and differential amplifier 48 comprise the aperture corrector. The aperture corrector of this invention is an improvement over those described in the before-mentioned text since, 1. remote control of the chrominance signal level is possible through FET 40, 2. the low frequency gain remains constant for changes of chrominance signal level, and 3. switching transients are avoided in main channel 26 whenever switch 14 is actuated.

Figure 3:
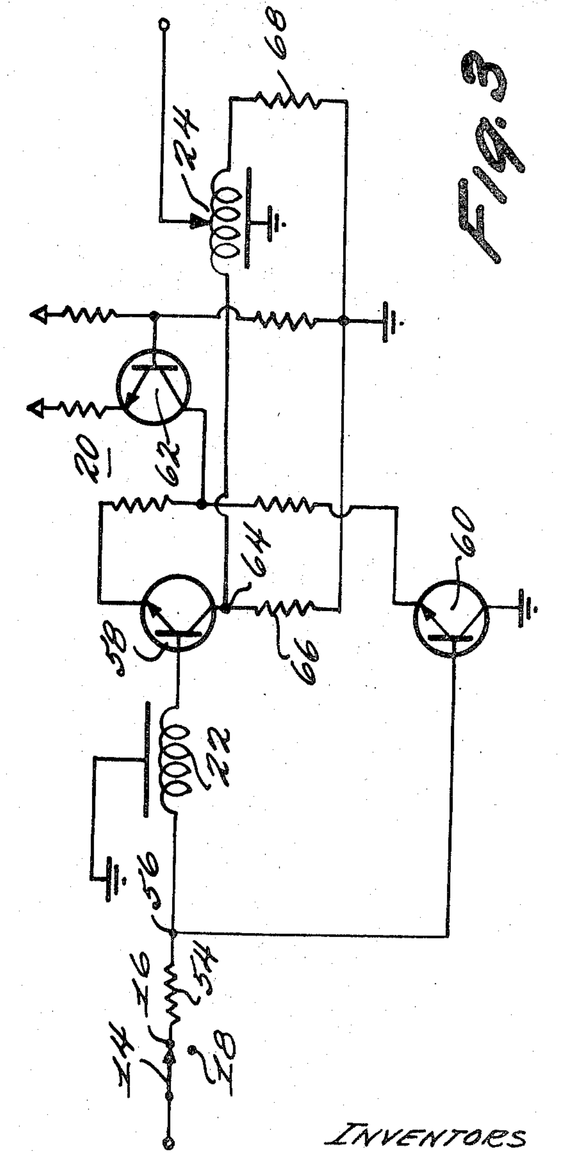
FIG. 3 is a circuit diagram of a portion of the diagram of FIG. 1.

In FIG. 3 is illustrated the detailed circuitry associated with the differential amplifier 20 and delay line 22 of FIG. 1, where common reference numerals refer to the same components. The video signal is connected through switch 14 and resistor 54 which has a value substantially equal to the characteristic impedance of line 22, to terminal 56. Differential amplifier 20 includes transistors 58, 60, and 62 with transistor 62 acting as a current source and thereby providing rejection of common mode signals. The output from the amplifier is taken from terminal 64 and applied to delay line 24, which is terminated in its characteristic impedance at both ends by resistors 66 and 68, respectively.

Delay line 22 as stated hereinbefore has an electrical length approximately equal to one-half the period of the chrominance frequency (delay of 140 nanoseconds, for example). Since the end of delay line 22 connected to the base of transistor 58 is essentially open circuited, as shown in FIG. 3 and since there is practically no attenuation of the line signal, the low-frequency components at either end of the line are of essentially the same amplitude and phase, and thus these components are canceled by the differential amplifier. However, the high frequency components near the chrominance component are emphasized. This boosting action is reduced on second harmonics as shown in FIG. 2 and thus the effect of these undesirable components is reduced in the final output signal.

Having described the structure of the invention, the operation thereof will now be described. Referring to FIG. 1, equalization of the video signal from the source 10 is initiated by moving switch 14 to terminal 16. The composite video signal is applied to terminal 50 through main channel 26. The chrominance signal is extracted in side loop 30 and its amplitude is adjusted as described hereinbefore. Assuming the amplitude of the luminance signal is too great with respect to that of the chrominance signal, the amplitude of the extracted chrominance signal will be increased by adjusting potentiometer 44. The adjusted signal is then added to the composite signal at terminal 50 thereby providing the required equalization, the equalized signal being applied to load 52.

When the equalizer side loop 30 is actuated by switch 14, low frequency transients in the main channel 12 are avoided because of the before-mentioned action of delay line 22 on low frequency signals. Other disturbances of channel 12 are minimized since this channel is not interrupted by switching in the side loop 30. The only effect in actuating the side loop is to abruptly change the overall frequency response, if the side loop 30 is set for other than zero gain.

Although the equalization has been described with respect to a composite video signal having luminance and chrominance components, it will be understood that this invention is applicable to any signal requiring equalization. Further, a variable gain, field effect transistor amplifier may be employed to adjust the gain of the extracted signal rather than the bridge circuit 32 shown in FIG. 1. In this case, only one polarity of the adjusted, extracted chrominance signal would be available.

Still numerous other modifications of the invention will become apparent to those or ordinary skill in this art. It is to be understood, however, that the foregoing disclosure is to be considered exemplary and not limitative.

We claim:

1. An equalizer for adjusting the amplitude of a first signal component of a composite video signal with respect to a second signal component of the composite signal, said first component being of a higher frequency than said second component, said equalizer comprising:
   - a first channel for passing said composite signal;
   - a second channel including:
     - an aperture corrector for extracting the first signal component from the composite signal, said aperture corrector including:
       - a differential amplifier;
       - delay means connected across the differential amplifier input terminals, said delay means having a delay of approximately one-half the period of said first signal component;
     - a bridge circuit responsive to said aperture corrector including a variable resistor in one arm thereof for adjusting the amplitude of the extracted first signal component from the differential amplifier, the differential amplifier output signal being applied to two opposite corners of the bridge circuit;
     - a further differential amplifier responsive to said bridge circuit, the input terminals of said differential amplifier being connected across the other two corners of the bridge circuit, the variable resistor of said bridge circuit and said further differential amplifier causing said adjusted, extracted signal to be bipolar;
   - means in said first channel responsive to said further differential amplifier for adding the bipolar, adjusted, extracted signal with said composite signal thereby accomplishing the desired equalization.

2. An equalizer as in claim 1 where said composite video signal is a composite television signal, said first signal component is the chrominance signal and said second signal component is the luminance signal component.

3. An equalizer as in claim 1 where said second channel includes switching means for actuating said second channel and thereby initiating the equalizing action.

4. An equalizer as in claim 1 including means for controlling said variable resistor, said controlling means being located at a point substantially removed from said variable resistor whereby remote control over the aperture corrector operation is obtained.

5. An equalizer as in claim 1 where said variable resistor is a field effect transistor.

6. An equalizer as in claim 5 where the other arm of the leg of said bridge circuit which includes said field effect transistor, includes a resistor made of the same material as the field effect transistor thereby providing temperature compensation for the bridge circuit.

7. An equalizer as in claim 6 where said field effect transistor and said resistor are made of silicon.